(12) United States Patent
Wilson et al.

(10) Patent No.: US 10,844,465 B2
(45) Date of Patent: Nov. 24, 2020

(54) STAINLESS STEEL ALLOYS AND TURBOCHARGER KINEMATIC COMPONENTS FORMED FROM STAINLESS STEEL ALLOYS

(71) Applicant: HONEYWELL INTERNATIONAL INC., Morris Plains, NJ (US)

(72) Inventors: Marc Wilson, Deyvillers (FR); Karel Svaricek, Brno (CZ); Marek Slouka, Brno (CZ); Ondrej Bojda, Brno (CZ); Klara Siskova, Brno (CZ); Jiri Saul, Brno (CZ); Radim Mrazek, Brno (CZ); Antonin Forbelsky, Brno (CZ); Richard Kocur, Brno (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 199 days.

(21) Appl. No.: 15/673,010

(22) Filed: Aug. 9, 2017

(65) Prior Publication Data
US 2019/0048441 A1 Feb. 14, 2019

(51) Int. Cl.
*C22C 30/00* (2006.01)
*F01D 25/00* (2006.01)
(Continued)

(52) U.S. Cl.
CPC .............. *C22C 30/00* (2013.01); *B22F 5/009* (2013.01); *C22C 33/0285* (2013.01); *C22C 38/02* (2013.01); *C22C 38/34* (2013.01); *C22C 38/44* (2013.01); *C22C 38/48* (2013.01); *C22C 38/52* (2013.01); *C22C 38/56* (2013.01);
(Continued)

(58) Field of Classification Search
CPC combination set(s) only.
See application file for complete search history.

(56) References Cited

U.S. PATENT DOCUMENTS 4,191,562 A * 3/1980 Silence ................. C22C 19/053
420/585
4,363,660 A * 12/1982 Wakita .................... C22C 38/30
420/12
(Continued)

FOREIGN PATENT DOCUMENTS

EP 2980254 A1 2/2016
GB 2128633 A 5/1984
(Continued)

OTHER PUBLICATIONS

ISO 15510, May 15, 2014, ISO copyright office, p. 1 (Year: 2014).*
Machine Translation of JPH02270943, Espacenet (Year: 2019).*

*Primary Examiner* — Sheng H Davis
*Assistant Examiner* — Christopher Douglas Moody
(74) *Attorney, Agent, or Firm* — Lorenz & Kopf, LLP

(57) ABSTRACT

Stainless steel alloys, and turbocharger kinematic components fabricated from such alloys (for example by sintering), are provided. A stainless steel alloy, or component fabricated therefrom, includes, by weight, about 20% to about 35% chromium, about 10% to about 15% nickel, about 10% to about 15% cobalt, about 10% to about 15% molybdenum, about 2.0% to about 4.0% carbon, about 0.4% to about 2.5% silicon, about 0.0% to about 1.0% niobium, and a balance of iron and other inevitable/unavoidable impurities.

11 Claims, 3 Drawing Sheets

(51) Int. Cl.

| | | |
|---|---|---|
| *C22C 38/48* | (2006.01) | |
| *C22C 33/02* | (2006.01) | |
| *C22C 38/44* | (2006.01) | |
| *C22C 38/56* | (2006.01) | |
| *F01D 17/16* | (2006.01) | |
| *C22C 38/52* | (2006.01) | |
| *F02C 6/12* | (2006.01) | |
| *C22C 38/02* | (2006.01) | |
| *B22F 5/00* | (2006.01) | |
| *C22C 38/34* | (2006.01) | |
| *B22F 3/12* | (2006.01) | |
| *F01D 9/02* | (2006.01) | |
| *F02B 37/24* | (2006.01) | |

(52) U.S. Cl.
CPC ......... *F01D 17/165* (2013.01); *F01D 25/005* (2013.01); *F02C 6/12* (2013.01); *B22F 3/12* (2013.01); *B22F 2301/35* (2013.01); *F01D 9/02* (2013.01); *F01D 17/16* (2013.01); *F02B 37/24* (2013.01); *F05D 2220/40* (2013.01); *F05D 2230/22* (2013.01); *F05D 2300/171* (2013.01)

(56) References Cited

U.S. PATENT DOCUMENTS

| | | | | |
|---|---|---|---|---|
| 4,487,630 | A * | 12/1984 | Crook | C22C 38/52 420/36 |
| 4,727,740 | A * | 3/1988 | Yabuki | C22C 19/055 420/446 |
| 4,933,008 | A * | 6/1990 | Fujiki | C22C 32/0078 123/188.8 |
| 5,242,758 | A * | 9/1993 | Hitchcock | C22C 1/0433 420/436 |
| 5,503,654 | A | 4/1996 | Takahashi et al. | |
| 6,004,507 | A * | 12/1999 | Morando | C22C 30/00 420/583 |
| 6,248,292 | B1 * | 6/2001 | Ando | B23K 35/3093 420/10 |
| 6,331,688 | B1 * | 12/2001 | Hallen | B23K 35/0255 219/136 |
| 6,406,563 | B2 * | 6/2002 | Kawano | C22C 37/04 148/324 |
| 6,511,554 | B1 * | 1/2003 | Kawano | C22C 33/08 148/324 |
| 6,916,444 | B1 | 7/2005 | Liang | |
| 9,238,853 | B2 | 1/2016 | Yamada et al. | |
| 2001/0023717 | A1 * | 9/2001 | Kawano | C22C 37/04 148/324 |
| 2005/0129563 | A1 * | 6/2005 | Sun | C22C 33/0285 419/38 |
| 2008/0289730 | A1 | 11/2008 | Ishida et al. | |
| 2014/0086755 | A1 * | 3/2014 | Schall | F01D 25/24 416/241 R |
| 2014/0234548 | A1 * | 8/2014 | Zimmermann | B22F 9/04 427/446 |
| 2014/0255245 | A1 * | 9/2014 | Schall | C22C 38/46 420/51 |
| 2015/0292395 | A1 * | 10/2015 | Dilalan | F16K 1/20 60/602 |
| 2016/0237838 | A1 * | 8/2016 | Kennedy | F01D 11/00 |
| 2018/0318922 | A1 * | 11/2018 | Valls Angles | B22F 1/0003 |

FOREIGN PATENT DOCUMENTS

| | | | | |
|---|---|---|---|---|
| JP | H02270943 | * | 11/1990 | ............ C22C 38/52 |
| JP | H06297188 A | | 10/1994 | |
| JP | 2000158020 A | | 6/2000 | |
| JP | 04299042 B2 | | 7/2009 | |

* cited by examiner

STAINLESS STEEL ALLOYS AND TURBOCHARGER KINEMATIC COMPONENTS FORMED FROM STAINLESS STEEL ALLOYS

TECHNICAL FIELD

The present disclosure generally relates to iron-based alloys, such as stainless steel alloys, and articles of manufacture formed therefrom. More particularly, the present disclosure relates to stainless steel alloys used in (for example) sintering applications, for example turbine and turbocharger kinematic components, wherein such kinematic components exhibit reduced friction and increased wear resistance at elevated (turbocharger operating) temperatures.

BACKGROUND

In the context of turbine engines, turbochargers use heat and volumetric flow of engine exhaust gas to pressurize or boost an intake air stream into a combustion chamber. Specifically, exhaust gas from the engine is routed into a turbocharger turbine housing. A turbine is mounted inside the housing, and the exhaust gas flow causes the turbine to spin. The turbine is mounted on one end of a shaft that has a radial air compressor mounted on an opposite end thereof. Thus, rotary action of the turbine also causes the air compressor to spin. The spinning action of the air compressor causes intake air to enter a compressor housing and to be pressurized or boosted before the intake air is mixed with fuel and combusted within the engine combustion chamber.

Various systems within turbochargers include tribological interfaces, that is, surfaces of components that interact with and move relative to one another while the turbocharger is in operation. Such components, which are commonly referred to as kinematic components, may be susceptible to friction and wear, especially at elevated temperatures, which reduces their service life. Examples of turbocharger systems that may include kinematic components include waste-gate systems, which divert exhaust gasses away from the turbine to regulate airflow to the turbine, and variable geometry systems, which include a row of moveable inlet vanes to accomplish the same purpose. These systems commonly include various components such as shafts, bushings, valves, and the like, which are kinematic components because they interact and move relative to one another, and are thus subject to friction wear.

Accordingly, it is desirable to provide materials that are suitable for use in fabricating kinematic components for turbine engines that exhibit reduced friction during motion relative to one another and that can resist wear during elevated temperature operations. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Stainless steel alloys, and turbocharger kinematic components fabricated from such alloys (for example by sintering), are provided.

In an embodiment, by way of example only, a stainless steel alloy includes, by weight, about 20% to about 35% chromium, about 10% to about 15% nickel, about 10% to about 15% cobalt, about 10% to about 15% molybdenum, about 2.0% to about 4.0% carbon, about 0.4% to about 2.5% silicon, about 0.0% to about 1.0% niobium, and a balance of iron and other inevitable/unavoidable impurities.

In another embodiment, by way of example only, a turbocharger kinematic component is fabricated from an alloy that includes a stainless steel alloy, which itself includes, by weight, about 20% to about 35% chromium, about 10% to about 15% nickel, about 10% to about 15% cobalt, about 10% to about 15% molybdenum, about 2.0% to about 4.0% carbon, about 0.4% to about 2.5% silicon, about 0.0% to about 1.0% niobium, and a balance of iron and other inevitable/unavoidable impurities This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. As used herein, numerical ordinals such as "first," "second," "third," etc., such as first, second, and third components, simply denote different singles of a plurality unless specifically defined by language in the appended claims. Furthermore, as used herein, the term "about" indicates, in one embodiment, an absolute variation of the stated value of +/−5%, whereas in other embodiments, the term about may be dismissed, and the exact value (as-stated) employed. All percentages herein are given by weight of the overall alloy.

All of the stainless steel alloys described herein may be understood as either: (1) "comprising" the listed elements in their various percentages, in an open-ended context or (2) "consisting of" the listed elements in their various percentages, in a closed-ended context. Alternatively, the stainless steel alloys described herein may be understood as (3) "consisting essentially of" the listed elements in their various percentages, wherein other elements may be present in amounts not effecting the novel/nonobvious characteristics of the alloy. Thus, as used herein, the terms "comprising," "consisting of," and "consisting essentially of" should be understood as applicable to all of the ranges of alloy compositions disclosed herein.

All of the embodiments and implementations of the stainless steel alloys, turbocharger kinematic components, and methods for the manufacture thereof described herein are exemplary embodiments provided to enable persons skilled in the art to make or use the invention and not to limit the scope of the invention, which is defined by the claims. Of course, the described embodiments should not be considered limited to such components, but may be considered applicable to any articles of manufacture where an iron alloy, or a stainless steel alloy may be employed. Furthermore, there is no intention to be bound by any expressed or implied theory presented in the preceding technical field, background, brief summary, or the following detailed description.

Figure 1:
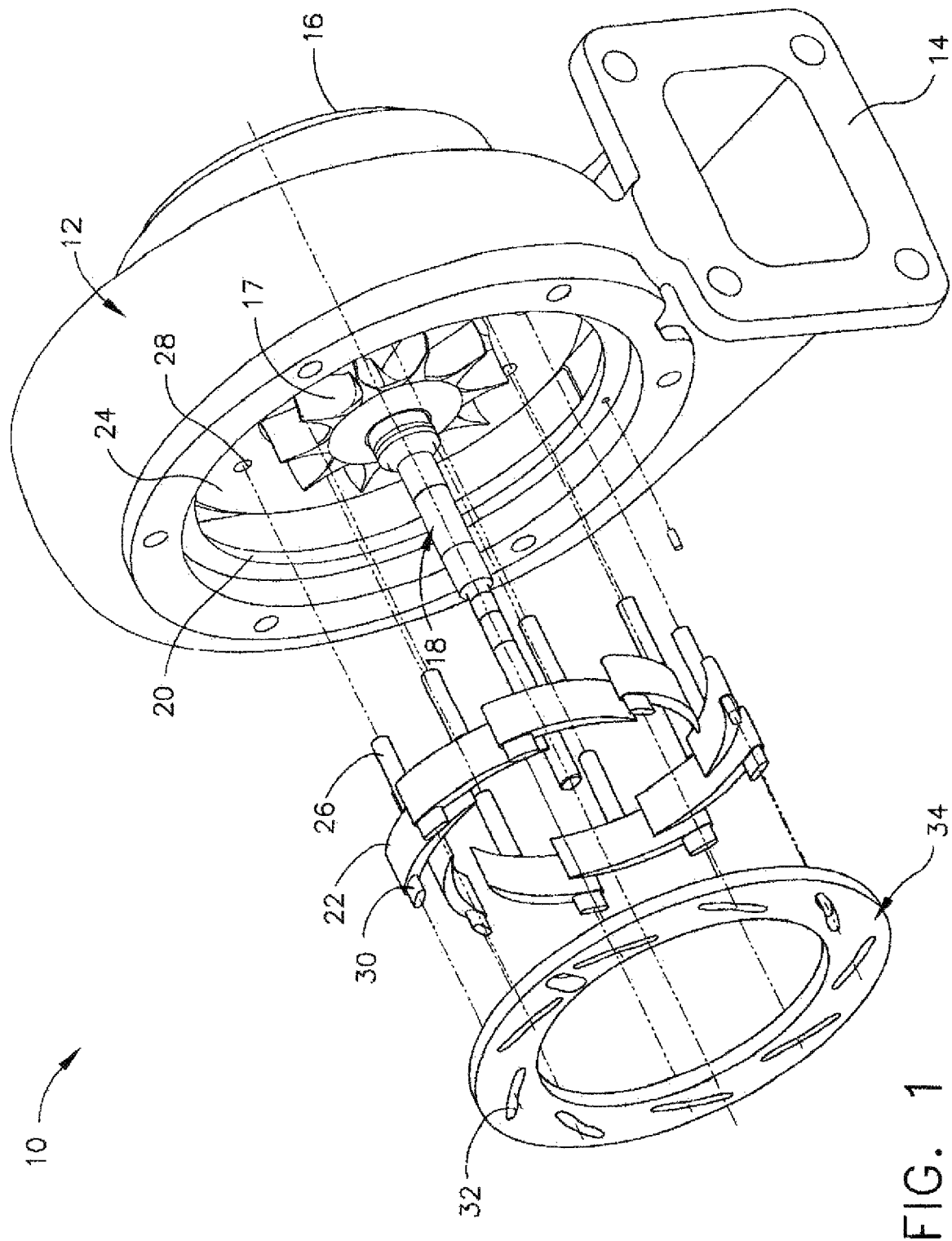
FIG. 1 is a system view of an embodiment of a turbocharged internal combustion engine in accordance with the present disclosure.

As noted above, the present disclosure is directed to stainless steel alloys for use in kinematic components of a turbocharger for purposes for reducing friction and wear with regard to the use and implementation of such kinematic components. As further noted above, a variable geometry turbocharger (among other possible turbocharger systems) employ such kinematic components. Accordingly, for completeness of description, FIG. 1 illustrates a portion of a variable geometry turbocharger (VGT) 10 comprising a turbine housing 12 having a standard inlet 14 for receiving an exhaust gas stream, and an outlet 16 for directing exhaust gas to the exhaust system of the engine. A volute is connected to the exhaust inlet and an integral outer nozzle wall is incorporated in the turbine housing casting adjacent the volute. A turbine wheel 17 and shaft assembly 18 is carried within the turbine housing 12. Exhaust gas, or other high energy gas supplying the turbocharger, enters the turbine housing through the inlet 14 and is distributed through the volute in the turbine housing for substantially radial delivery to the turbine wheel through a circumferential nozzle entry 20.

Multiple vanes 22 are mounted to a nozzle wall 24 machined into the turbine housing using shafts 26 that project perpendicularly outwardly from the vanes. The shafts 26 are rotationally engaged within respective openings 28 in the nozzle wall. The vanes each include actuation tabs 30 that project from a side opposite the shafts and that are engaged by respective slots 32 in a unison ring 34, which acts as a second nozzle wall. The tabs 30, slots 32, and other described components move relative to one another, and as such it would be desirable to reduce the friction therebetween for tribological purposes.

Figure 2:
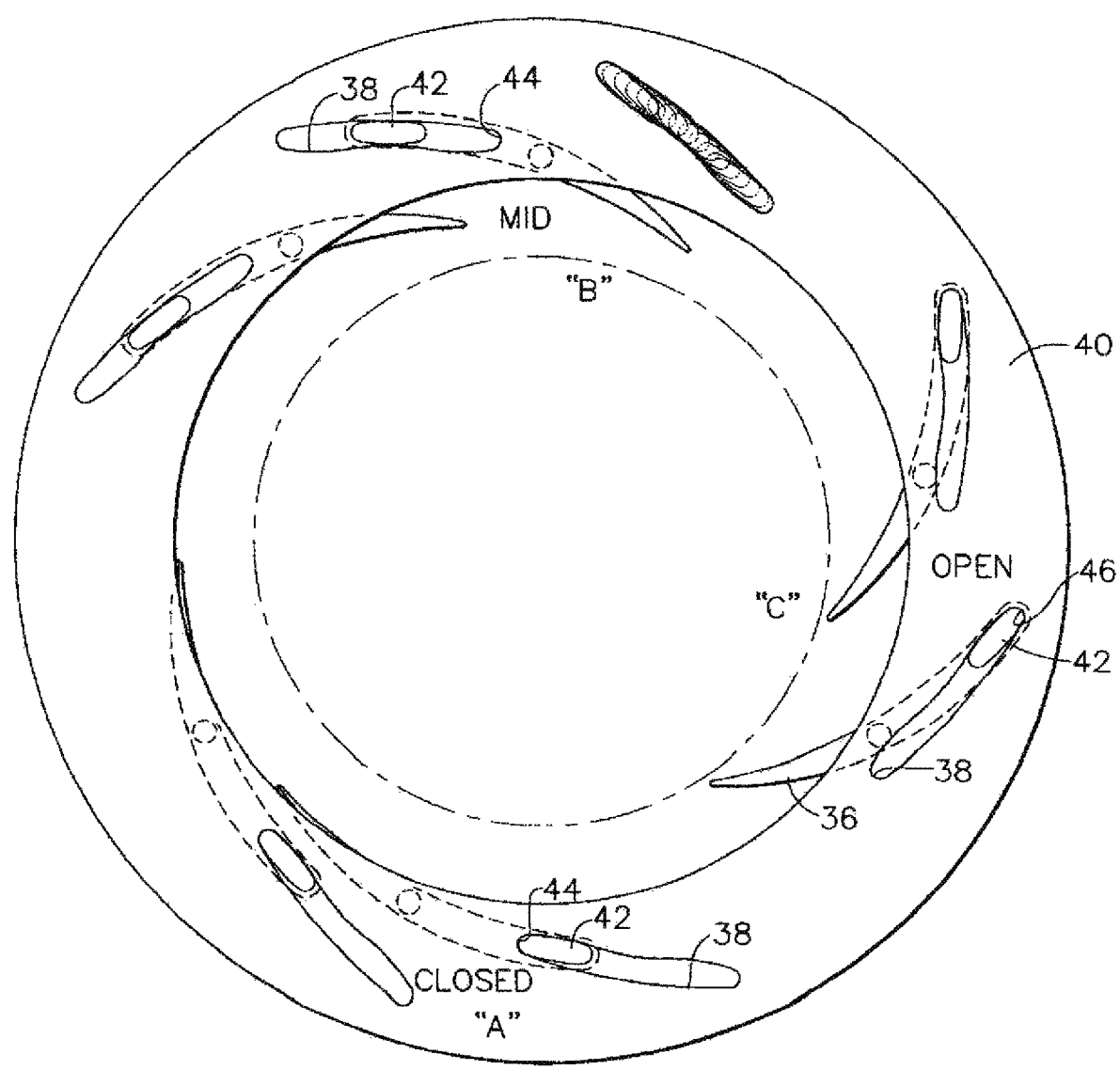
FIG. 2 is a cross-section view of the turbocharged internal combustion engine of FIG. 1.

FIG. 2 illustrates the general movement pattern of conventional vanes 36, as used in the VGT described and illustrated above, when actuated by the unison ring 34. Each vane tab 42 is disposed within a respective elongated slot 38 of a unison ring 40. In a closed position "A", the vane tab 42 is positioned adjacent a first end 44 of the slot 38. This position is referred to as a closed position because the vane is not flared radially outward, thereby serving to limit the flow of exhaust gas to the turbine. At an intermediate position "B" the unison ring 40 has been rotated a sufficient amount such that the vane tab 42 is moved within the slot 38 away from the first slot end 44 (as opposed to second slot end 46) towards a middle position of the slot. Again, it would be desirable to reduce friction as the components of the vanes 36 move relative to the components of the unison ring 40, for tribological purposes.

Figure 3:
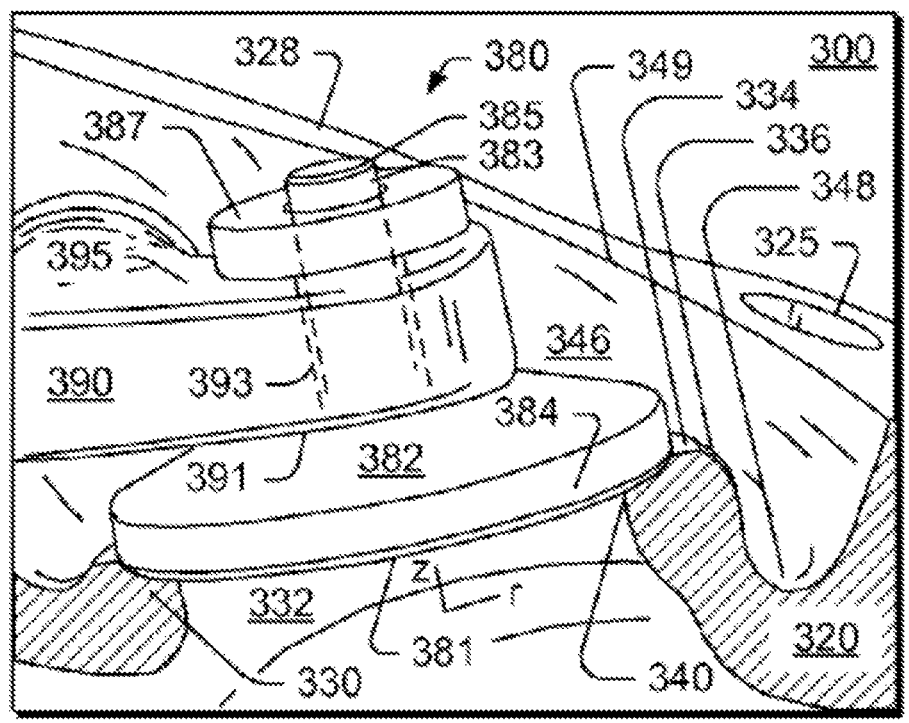
FIG. 3 is a system view of a turbocharger including a waste-gate system in accordance with the present disclosure.

Additionally, as noted above, waste-gate systems may also include tribological components, and as such, for completeness of disclosure, FIG. 3 illustrates an exemplary waste-gate system. Specifically, FIG. 3 shows a cutaway view of an example of an assembly 300 that includes a turbine housing component 320 and a waste-gate 380. In the assembly 300, the turbine housing component 320 includes an opening 340, for example, as defined by a surface 332 of a substantially cylindrical wall portion 330 of the turbine housing component 320. As shown, the wall 332 extends to an edge (e.g., defining the opening 340) and then flattens joining a relatively flat surface 334, which may be referred to as a waste-gate seat. In the example of FIG. 3, the surface 332 defines a relatively short passage, for example, having an axis (e.g., a z-axis), from which the surface 332 is disposed at a radial distance (e.g., an r-axis). Extending away from the opening 340, the seat 334 descends along another surface 336 (e.g., of the substantially cylindrical wall portion 330) to a floor 348 of an exhaust chamber formed in part by the turbine housing component 320, for example, in combination with a wall surface 346. As shown in FIG. 3, the wall surface 346 of the turbine housing component 320 rises to an edge that defines an opening 349 of the exhaust chamber and then extends outwardly to a relatively flat surface 328, which may include one or more apertures, etc., such as an aperture 325, for example, to attachment of another component to the turbine housing component 320.

In the example of FIG. 3, the waste-gate 380 includes a plug portion 382 that is connected to a waste-gate arm 390. The plug portion 382 includes a lower surface 381, a stem 383 that extends upwardly to an upper end 385 of the plug portion 382 and a rim surface 384 (e.g., disposed at a radius about the stem 383 and having an axial height). As shown, the stem 383 is received by a bore 393 of the waste-gate arm 390 where the bore 393 extends between a lower surface 391 and an upper surface 395 of the waste-gate arm 390. In the example of FIG. 3, a clamping washer 387 clamps to the stem 383 of the plug portion 382 to thereby prevent the stem 383 from sliding through the bore 393 of the waste-gate arm 390. Accordingly, as the waste-gate arm 390 pivots, the lower surface 381 of the plug portion 382 is positioned with respect to the seat 334 of the turbine housing component 320 for opening and closing of the waste-gate 380.

Typical embodiments of the present disclosure reside in a motor vehicle equipped with a gasoline or diesel powered internal combustion engine and a turbocharger. The turbocharger is equipped with a unique combination of features that may, in various embodiments, provide efficiency benefits by relatively limiting the amount of (and kinetic energy of) secondary flow in the turbine and/or compressor, as compared to a comparable unimproved system. Stainless steel alloys for use in turbochargers may have operating temperatures up to about 1050° C. (or up to about 1100° C.), or greater. Some embodiments of the present disclosure are directed to stainless steel alloys that include iron alloyed with various alloying elements, as are described in greater detail below in weight percentages based on the total weight of the alloy.

In an embodiment, the stainless steel alloy of the present disclosure includes from about 20% to about 35% chromium (Cr), for example from about 22% to about 33% Cr, such as about 24% to about 31% Cr, for example about 26% to about 29% Cr. A specific embodiment may utilize about 27.5% Cr. Also possible are ranges from about 20% to about 22% Cr, about 22% to about 24% Cr, about 24% to about 26% Cr, about 26% to about 28% Cr, about 28% to about 30% Cr, about 30% to about 32% Cr, or about 32% to about 35% Cr. It has been discovered that if Cr is added excessively, coarse primary carbides of Cr are formed, resulting in extreme brittleness. As such, the content of Cr is preferably limited to a maximum of about 35% so as to maintain an appropriate volume fraction within the stainless steel for corrosion resistance.

In an embodiment, the stainless steel alloy of the present disclosure includes from about 10% to about 15% nickel (Ni), for example about 11% to about 14% Ni, for example about 12% to about 13% Ni. A specific embodiment may utilize about 12.5% Ni. Also possible are ranges from about 10% to about 11.5% Ni, about 11.5% to about 13% Ni, and about 13% to about 15% Ni. Ni, together with optional nitrogen (which is described in greater detail below), is an element to stabilize the austenite phase. To reduce a production cost, if the content of expensive Ni is lowered, the decrement of Ni can be replaced by increasing the content of optional nitrogen that form an austenite phase. However, if the content of Ni is excessively lowered, optional nitrogen would be excessively needed so that the corrosion resistance and the hot formability characteristics are deteriorated. Thus, the content of Ni preferably ranges from about 10% to about 15%.

In an embodiment, the stainless steel alloy of the present disclosure includes from about 10% to about 15% molybdenum (Mo), such as about 11% to about 14% Mo, for example about 12% to about 13% Mo. A specific embodiment may utilize about 12.5% Mo. Also possible are ranges from about 10% to about 11.5% Mo, about 11.5% to about 13% Mo, and about 13% to about 15% Mo. As molybdenum also increases the risk of intermetallic phase formation, the level should be maximized to 15%, and preferably less than 14%. If the content of Mo is excessive, Mo is likely to form the sigma phase when it is annealed, thereby deteriorating the corrosion resistance and impact resistance, which is deleterious to the tribological properties of the kinematic components of a turbocharger described herein.

In an embodiment, the stainless steel alloy of the present disclosure includes from about 10% to about 15% cobalt (Co), for example about 11% to about 14% Co, for example about 12% to about 13% Co. A specific embodiment may utilize about 12.5% Co. Also possible are ranges from about 10% to about 11.5% Co, about 11.5% to about 13% Co, and about 13% to about 15% Co. As found herein, in amounts above about 10%, The presence of Co in the stainless steel improves its durability and hardness at higher temperatures, and thus are included herein in amounts of 10% or more. However, stainless steels with Co in an amount of greater than about 15% have a somewhat greater tendency for decarburization and are more sensitive to cracking when exposed to abrupt temperature changes, and as such, the present disclosure is limited to amounts of Co of about 15% or less.

As compared with stainless steel alloys known in the prior art, it should be appreciated that the stainless steel alloys disclosed herein typically include a relatively low amount of Ni and a relatively low amount of Co, and a relatively high amount of Mo. Thus, as between Ni, Co, and Mo, specific embodiments may employ amounts of Ni that include amounts/ranges of 13% or below, such as amounts/ranges of 12.5% or below; these embodiments may also employ amounts of Co that include amounts/ranges of 13% or below, such as amounts/ranges of 12.5% or below; further, these embodiments may also employ amounts of Mo that include amounts/ranges of 12% or above, such as amounts/ranges of 12.5% or above.

In an embodiment, the stainless steel alloy of the present disclosure includes from about 2.0% to about 4.0% carbon (C), for example about 2.5% to about 3.5% C. A specific embodiment may employ about 3.0% C. C has a function of improving the sintering ability of the alloy. C, when present in the relatively-high disclosed range, also forms a eutectic carbide with niobium (which, as discussed in greater detail below, may also be included in the alloy), which improves wear resistance. To exhibit such functions effectively, the amount of C should be 2.0% or more. Further, C is effective for strengthening a material by solid solution strengthening. To maximize the corrosion resistance, the content of C is lowered to about 4.0% and below.

In an embodiment, the stainless steel alloy of the present disclosure includes from about 0.4% to about 2.5% silicon (Si), for example about 1.0% to about 2.0% Si. A specific embodiment may employ about 1.5% Si. Si has effects of increasing the stability of the alloy metal structure and its oxidation resistance. Further, Si has functions as a deoxidizer and also is effective for improving castability and reducing pin holes in the resulting sintered products, when present in an amount greater than about 0.4%. If the content of Si is excessive, Si deteriorates the mechanical property such as impact toughness of stainless steel. Therefore, the content of Si is preferably limited to about 2.5% and below.

In an embodiment, the stainless steel alloy of the present disclosure includes from about 0.0% to about 1.0% niobium (Nb), for example from about 0.3% to about 0.7% Nb. It has been discovered that the friction-resistant, wear-resistant, stainless steel of the present disclosure is provided with a high castability by forming eutectic carbides of Nb as well as a high strength and ductility, and as such, in an embodiment, Nb is present in an amount of about 0.5%. However, as indicated by the 0.0% lower range-end, embodiments are contemplated wherein Nb is not present.

Certain inevitable/unavoidable impurities may also be present in the stainless steel alloy of the present disclosure, for example as described below with regard to phosphorous, sulfur, and nitrogen (the amounts of such described impurities (and others) are minimized as much as practical).

In an embodiment, phosphorus (P) may be present in the alloy, but is minimized to about 0.03% or less. P is seeded in the grain boundary or an interface, and is likely to deteriorate the corrosion resistance and toughness. Therefore, the content of P is lowered as low as possible. Preferably, the upper limit content of P is limited to 0.03% in consideration of the efficiency of a refining process. The contents of harmful impurities, such as P are as small as possible. However, due to cost concerns associated with removal of these impurities, and the P content is limited to 0.03%.

In an embodiment, sulfur (S) may be present in the alloy, but is minimized to about 0.03% or less. S in steels deteriorates hot workability and can form sulfide inclusions that influence pitting corrosion resistance negatively. It should therefore be limited to less than 0.03%. S deteriorates the hot formability, thereby deteriorating the corrosion resistance. Therefore, the content of S is lowered as low as possible. The contents of harmful impurities, such as S (sulfur), are as small as possible. However, due to cost concerns associated with removal of these impurities, the S content is limited to about 0.03%.

Nitrogen (N) is an element capable of improving the high-temperature strength and the thermal fatigue resistance like C, and such effects can be obtained when the amount of N is 0.01% or more. However, N is optional, and need not be included in any amount. On the other hand, to insure the production stability and to avoid the brittleness due to the precipitation of Cr nitrides, the upper limit of N should be about 0.03%. N, together with Ni, is one of elements that contribute stabilization of an austenite phase. As the content of N increases, the corrosion resistance and high strengthening are achieved. However, when the content of N is too high, the hot formability of steel is deteriorated, thereby lowering the production yield thereof. Therefore, the content of N preferably ranges up to a maximum of about 0.03%, though it need not be included at all.

Additionally, it should be appreciated that, although completely optional, boron (B), calcium (Ca), and cerium (Ce) may be added/(present) in very small quantities in the disclosed steels to improve hot workability. The preferred levels are for B, Ca, and Ce, if included at all, are, individually, less than about 0.005% each.

Other elements, which may be included in some stainless steels known in the prior art, may be specifically excluded (or substantially and/or effective excluded) from the stainless steel alloys of the present disclosure. These excluded elements include, for example, one or more of manganese (Mn), tungsten (W), and/or vanadium (V).

The disclosed alloys, being stainless steel alloys, also include a balance of iron (Fe). As used herein, the term "balance" refers to the amount remain to achieve 100% of a total alloy, in terms of weight. It should be appreciated that this amount may differ if an embodiment "comprises," "consists of," or "consists essentially of" the stated elements, with the balance being Fe.

The articles of manufacture described herein, such as the kinematic components of a turbocharger fabricated with the above-described stainless steel alloys, may be formed using sintering processes. For example, as is known in the art, sintering refers to a process of compacting and forming a solid mass of material by heat and/or pressure without melting the material to the point of liquefaction.

As such, embodiments of the present disclosure provide materials that are suitable for use in fabricating kinematic components for turbine engines that exhibit reduced friction during motion relative to one another and that can resist wear during elevated temperature operations. As noted above, examples of turbocharger systems that may include kinematic components include waste-gate systems and variable geometry systems. Of course, the described embodiments should not be considered limited to such components, but may be considered applicable to any articles of manufacture where an iron alloy, or a stainless steel alloy may be employed.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbocharger kinematic component configured for operation at temperatures up to about 1050° C., comprising:
    a sintered iron-based alloy, wherein the sintered iron-based alloy comprises, by weight:
    about 20% to about 35% chromium;
    about 10% to about 15% nickel;
    about 10% to about 15% cobalt;
    about 10% to about 15% molybdenum;
    about 2.0% to about 4.0% carbon;
    about 0.4% to about 2.5% silicon;
    about 0.0% to about 1.0% niobium; and
    a balance of iron and inevitable/unavoidable impurities, wherein the element manganese is excluded beyond impurity levels.

2. The turbocharger kinematic component of claim 1 comprising about 22% to about 33% chromium.

3. The turbocharger kinematic component of claim 1 comprising about 24% to about 31% chromium.

4. The turbocharger kinematic component of claim 1 comprising about 26% to about 29% chromium.

5. The turbocharger kinematic component of claim 1 comprising about 11% to about 14% nickel.

6. The turbocharger kinematic component of claim 1 comprising about 12% to about 13% nickel.

7. The turbocharger kinematic component of claim 1 comprising about 11% to about 14% cobalt.

8. The turbocharger kinematic component of claim 1 comprising about 12% to about 13% cobalt.

9. The turbocharger kinematic component of claim 1 comprising about 2.5% to about 3.5% carbon.

10. The turbocharger kinematic component of claim 1 comprising about 0.3% to about 0.7% niobium.

11. The turbocharger kinematic component of claim 1, wherein the turbocharger kinematic component is selected from the group consisting of: a vane and unison ring assembly of a variable geometry turbocharger, and a waste-gate assembly of a turbocharger.

* * * * *